March 2, 1965  E. C. BREKELBAUM ET AL  3,171,556
FRONT END AND OVERSHOT LOADER

Filed Sept. 17, 1962  4 Sheets-Sheet 1

INVENTORS
ERWIN C. BREKELBAUM
ROBERT J. BUSHONG &
BY JOHN F. KRUECK

Oberlin, Maky & Donnelly
ATTORNEYS

March 2, 1965   E. C. BREKELBAUM ET AL   3,171,556
FRONT END AND OVERSHOT LOADER
Filed Sept. 17, 1962   4 Sheets-Sheet 2

INVENTORS
ERWIN C. BREKELBAUM
ROBERT J. BUSHONG &
BY JOHN F. KRUECK
Oberlin, Maky & Donnelly
ATTORNEYS March 2, 1965  E. C. BREKELBAUM ET AL  3,171,556
FRONT END AND OVERSHOT LOADER
Filed Sept. 17, 1962  4 Sheets-Sheet 3

INVENTORS
ERWIN C. BREKELBAUM
ROBERT J. BUSHONG &
BY JOHN F. KRUECK

Oberlin, Maky & Donnelly
ATTORNEYS

United States Patent Office 3,171,556
Patented Mar. 2, 1965

3,171,556
FRONT END AND OVERSHOT LOADER
Erwin C. Brekelbaum, Elyria, Robert J. Bushong, Vermilion, and John F. Krueck, Elyria, Ohio, assignors, by mesne assignments, to Koehring Company, Milwaukee, Wis., a corporation of Wisconsin
Filed Sept. 17, 1962, Ser. No. 224,137
8 Claims. (Cl. 214—140)

This invention relates generally as indicated to a front end and overshot loader and more particularly to a stabilizer precluding relative movement of the tractor frame and supporting wheels during the overshot loading operation.

Tractor loaders are generally provided with a heavy one-piece tractor frame designed especially to reduce twisting and deflection to keep all of the tractor components in perfect alignment. The front axle of the tractor is generally rigidly secured to such frame, but the rear steering axle may be mounted in a saddle pivoted to the underside of such frame about a central longitudinal axis to provide a substantial amount of vertical articulation. This pivoting of the rear steering axle ensures that the four wheels of the tractor will always be in ground engagement and thus maintains a four-wheel tractive effort providing excellent stability even over very rough terrain. However, if the tractor loader is employed as an overshot loader, the load being lifted must be swung over the top of the machine towards the rear shifting the center of gravity of the machine near the pivoting rear axle. If such rear axle is substantially inclined and/or the load in the loading bucket is off-center, the lateral stability of the machine may be substantially impaired. Moreover, the chassis frame, in such condition, may be subjected to twisting and deflecting forces which may impair component alignment.

It is accordingly a principal object of the present invention to provide a front end and overshot loader having a stabilizer precluding relative movement of the frame and wheel axles during overshot loading.

A further principal object is the provision of a stabilizer for front end and overshot loaders which may either be selectively or automatically energized to lock the rear axle and frame against relative movement as the load swings to an overshot loading position.

A further object is the provision of a stabilizer for tractor loaders and the like providing frame and lateral stability for overshot loading while permitting ground engaging four wheel tractive effort for digging.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
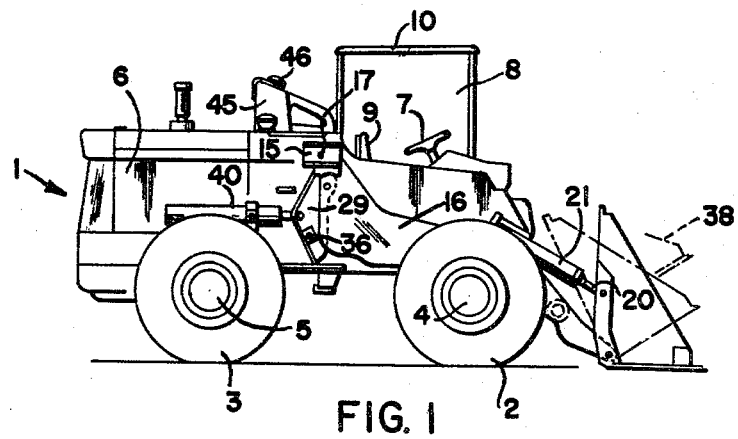
FIG. 1 is a side elevation of a front end and overshot loader in accordance with the present invention shown in digging position.

Referring now more specifically to the drawings and first to FIGS. 1 through 4, it will be seen that the front end and overshot loader of the present invention comprises a tractor 1 having front and rear pairs of wheels 2 and 3 mounted on axles 4 and 5 respectively. All of the wheels may be driven by an engine (not shown) in compartment 6. Generally, the rear pair of wheels 3 are the steering wheels actuated by the steering wheel 7 in the driver's compartment 8 provided near the front end of the tractor 1. The driver's seat 9 in such compartment is protected by a roof structure 10. The tractor 1 includes a rigid heavy, one-piece chassis frame 12 which includes a rearwardly extending portion 13 supporting the engine in compartment 6.

Brackets 15, formed integrally with the chassis frame on each side of the tractor, pivotally support the proximal ends of S-shaped boom arms 16 at the provided pivot 17. Pivotally supported between the distal pivots 18 on the boom arms 16, there is provided a loading bucket 19. Also connected to the bucket 19 are the distal ends of rods 20 of tilt cylinders 21, there being provided one tilt cylinder for each of the boom arms. Each such tilt cylinder forms the outer linkage of a three-part self-leveling linkage which includes in addition to the tilt cylinder, an intermediate S-shaped link 23 and a further S-shaped link 24 for each boom arm, such links being pivotally interconnected at 25. The link 23 of such three-part linkage is intermediately pivoted to the boom arm 16 at 26 and to the blind end of the tilt cylinder 21 at 27. The links 23 and 24 fit within the hollow boom arm 16 and, in the digging position shown in FIG. 1, such links fold together in a nested relationship providing a compact self-leveling linkage for the bucket as it moves from the digging to the front loading position shown in FIG. 2.

The proximal end of each link 24 is pivoted at 28 to an overshot member 29, the upper end of which is also pivoted at 17 to the bracket 15 of the chassis frame. A lift cylinder 30 is provided for each of the boom arms and such cylinders are pivoted to the arms at 31 with the rods 32 thereof being connected to the lower end of the respective overshot member as seen at 33. Extension of the lift cylinders 30 then elevates the bucket 19 from the digging position shown in FIG. 1 to the forward loading position shown in FIG. 2.

The overshot member 29, to which the rod 32 is pivoted, may be locked to the plate 35 as by a pin through the aperture 36, such plate 35 being a part of the bracket 15 secured to the side of the tractor chassis frame. In this manner, the overshot member is stationary and rigidly connected to the chassis frame so that the loader may be utilized simply as a front end loader. Since the pivot 28 is fixed, during such front end loading, the linkage 24, 23, 21, will serve to maintain the bucket substantially level or in its optimum load receiving position as thus elevated after being initially tilted back as shown by the phantom line position 38 in FIG. 1. The tilt cylinders 21 then need only be extended to tilt the bucket to the phantom line position 39 shown in FIG. 2 to dump the contents thereof into a waiting truck, railroad car or the like.

Figure 3:
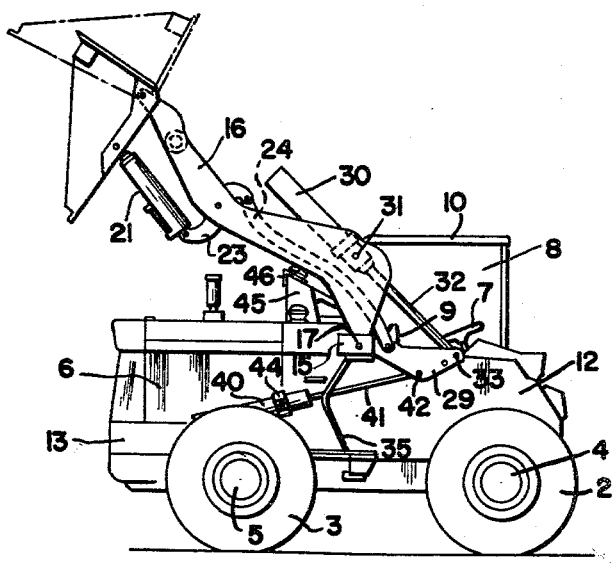
FIG. 3 is a similar side elevation showing the components in overshot loading position.
Figure 2:
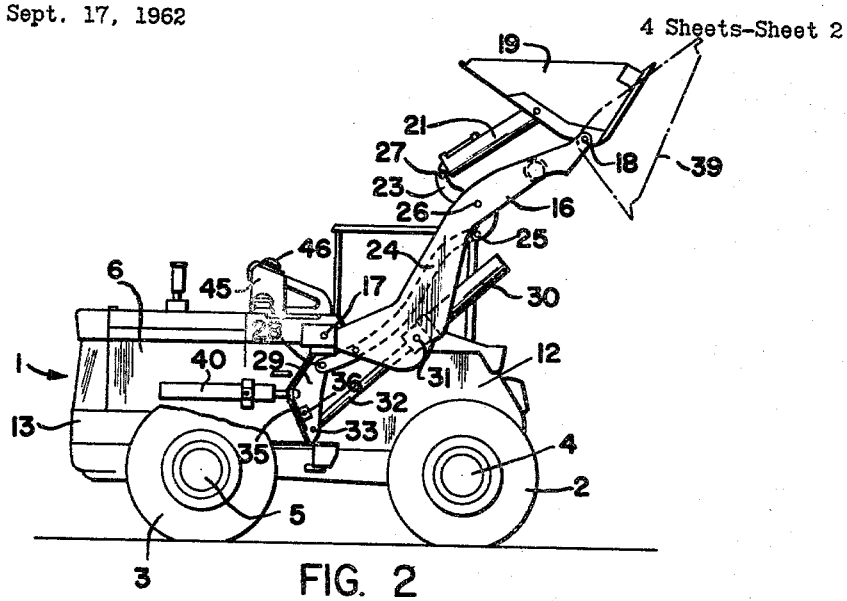
FIG. 2 is a side elevation of such loader similar to FIG. 1 showing the components thereof in front loading position.

To employ the loader as an overshot loader, the locking pin will be removed from the aperture 36 and the overshot cylinder 40 will be employed to pivot the overshot member 29 about the pivot 17 to swing the arms further to a rear loading position as seen in FIG. 3. The rod 41 of the overshot cylinder 40 is pivoted to the overshot member 29 at 42 and projects through a vertically elongated slot in the plate 35. The overshot cylinder assemblies for each arm are mounted in trunnions 44 pivoted to the side of the tractor. It can now be seen that the machine which forms the environment of the present invention comprises the tractor loader which can be utilized either as a front loader or an overshot loader and in any event the lift cylinders 30 will first be extended to elevate the bucket 19 to its front loading position and if it is desired to load in an overshot position, the overshot cylinders 40 are then extended to pivot the overshot members 29 swinging both the boom structures and the attendant lift cylinders back to the position shown in FIG. 3 for overshot loading. An upstanding support bracket 45 mounted on the chassis frame 12 behind the driver's compartment 8 is provided with two laterally extending wings having arm stops or bumpers 46 thereon which act as stops for the arms 16 in the overshot position. The front end and overshot loader illustrated generally forms no part of the present invention. For a more detailed disclosure of such front end and overshot loader, reference may be had to the copending application of Erwin C. Brekelbaum et al., Serial No. 208,041, filed July 6, 1962, entitled "Front End and Overshot Loader."

Figure 4:
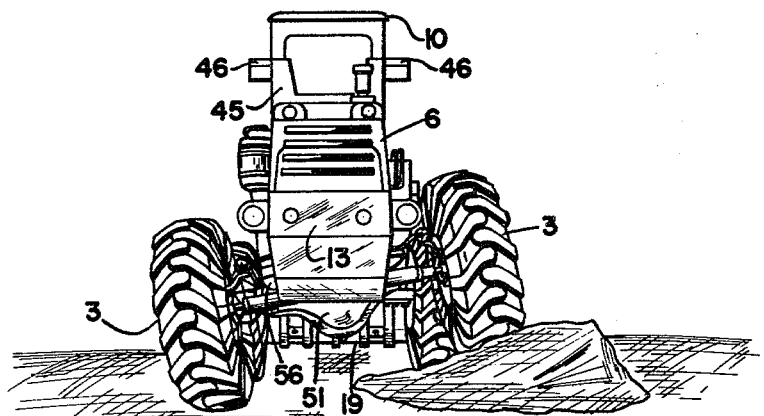
FIG. 4 is an end elevation of such loader illustrating the manner in which the rear axle is mounted for pivotal movement with respect to the tractor frame.
Figure 7:
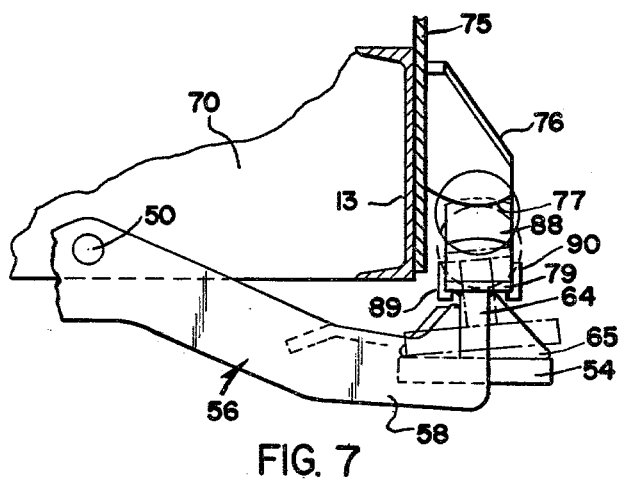
FIG. 7 is a vertical section taken substantially on the line 7—7 of FIG. 5.
Figure 9:
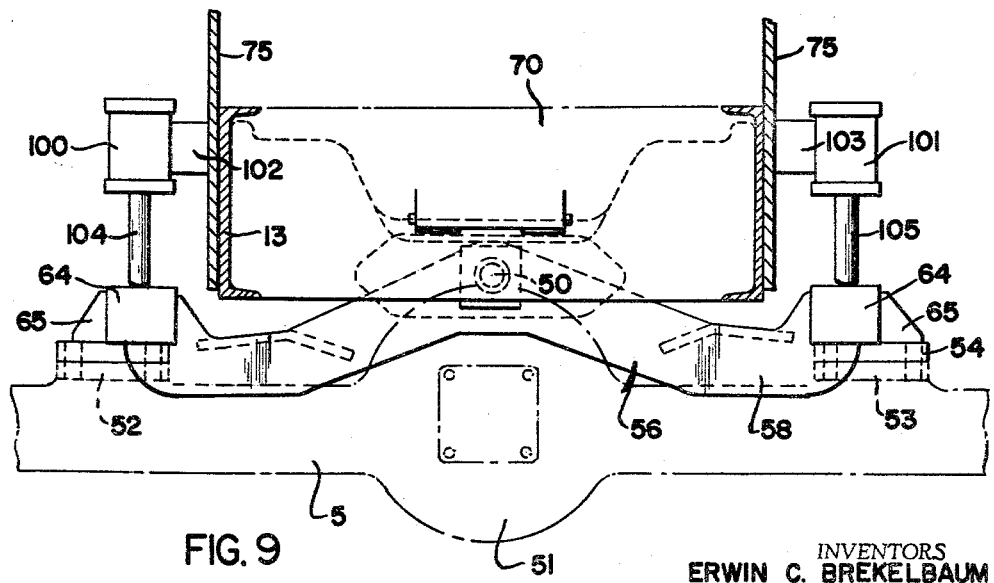
FIG. 9 is a vertical section similar to FIG. 7 showing a further form of the present invention.

Referring now more particularly to FIGS. 4, 7 and 9, it will be seen that while the front axle 4 is bolted or otherwise rigidly secured to the frame 12, the rear axle 5 is mounted for limited oscillatory movement about the longitudinally extending central axis 50 in the underside of the chassis. The rear axle 5 includes a differential housing 51 and two mounting plates 52 and 53 on either side thereof to which are secured the support plates 54 at each end of a rear axle saddle 56. The axle saddle 56 which is an integral rigid one-piece construction, includes four transverse members 58, 59, 60 and 61 paired on each side of the axle and secured at their ends to vertically extending elongated end members 64. Such end members are rigidly secured to the support plates 54 and reinforcing webs 65 may be provided further ensuring the rigidity of such saddle. Nut and bolt assemblies 57 may be employed to secure the axle 5 firmly to the support plates 54 of the saddle, there being four such fasteners for each support plate.

The axle saddle 56 is thus an integrated structure with the transverse members 58 through 61 thereof being humped in the middle as seen in FIGS. 7 and 9 to clear the axle differential housing 51 and also to provide an elevated pivotal connection between the saddle and its attached axle and the frame of the vehicle 13. The channel portion 13 of the chassis frame 12 is provided with transverse members 70 and 71 which may be straddled by the saddle transverse members 58 and 59 and 60 and 61, respectively. Pivot pins 72 and 73 may be provided securing the saddle to the frame. The transverse members 70 and 71 may also serve as engine mounts and further to rigidify the channel framing 13 supporting the engine. Suitable removable lock rings or the like may be employed to hold the pins 72 and 73 in place and such pins provide the axis 50 about which the saddle and rear axle may be vertically articulated to provide the complete four wheel ground engagement for high tractive effort during digging. With such saddle mounted rear axle, approximately 23° of vertical articulation can be obtained with the result being ground hugging tractive and steering ability even over very rough terrain as seen in FIG. 4.

It can be seen that when overshot loading, as the load is shifted rearwardly over the rear axle, and if such rear axle is substantially inclined and/or the load in the loading bucket is off-center, the lateral stability of the machine may be substantially impaired. Moreover, the chassis frame 13 may be subjected to twisting and deflecting forces which may impair component alignment. For example, as the load shifts rearwardly, lateral instability may tend to lift one of the front wheels 2 from the ground and this tendency, even though the front wheel may never leave the ground, will subject the chassis frame to undesirable deflection. With the present invention, there is provided a means schematically to stabilize the rear axle and the chassis frame during overshot loading.

Referring now to the embodiment of the invention disclosed in FIGS. 5 through 8, it will be seen that side plates 75 secured to the exterior of the chassis frame engine mount portion 13 are provided with blocks 76 on each side of the tractor which may suitably be welded to such side plates. Such blocks are inclined slightly rearwardly and provided with a curved bottom surface 77 which faces downwardly and forwardly and projects a substantial distance laterally of the plate 75. Mounted on the elongated saddle member 64 is a support plate 79 which includes an upturned end portion 80 of the planar configuration seen more clearly in FIG. 8. Two reinforcing webs 81 and 82 may be provided rigidifying the angle between the upstanding portion 80 and the horizontal main portion 79 of such support plate. Suitable fasteners 83 may be employed to secure to such upstanding portion the cylinder 84 of a pneumatic piston-cylinder assembly 85. Such piston-cylinder assembly may be a pneumatic single-acting spring return mechanism with the projecting rod 86 being pivotally connected at 87 to a wedge block 88 which is slidably mounted on the rail support 79 and confined for such sliding movement by depending gibs 89 and 90 secured to the wedge block 88 and underlying the top rail 79.

The top of the wedge block 88 is provided with two inclined curved surfaces 94 and 95 which are stepped or offset from each other as indicated by the surface 96. The curved surfaces 94 and 95 are curved oppositely from the surface 77 on the lower side of the bracket 76 secured to the side of the machine. As air is admitted to the blind end of the cylinder 84, the rod 86 will be extended moving the wedge block 88 to its dotted line position 98 and the surface 95 will underlie the surface 77 in effect blocking up the frame on the axle saddle. Should the axle 5 be tilted with respect to the frame, the surface 94 may be sufficient to block up the machine. In any event, the wedge block 88 will move either to its completely extended position or until the surfaces 94 and 95 contact the surface 77 precluding further movement and in such position, a wedge line contact will be obtained precluding subsequent relative movement of the frame and axle 5. It will, of course, be understood that the wedge blocks on the side of the machine need not move to the same extent, but only to the extent necessary to preclude relative axle and frame movement. It can now be seen that when the piston-cylinder assemblies which actuate the wedge blocks on each side of the machine are extended, the axle will be precluded from moving relative to the frame and when the bucket 19 moves to the overshot position, there will be no twisting or torsional deflection of the frame and, of course, lateral stability of the machine will not be impaired. Spring mechanisms 99 may be employed to return the blocks to their original position when the air pressure is released as hereinafter described.

Referring now to the embodiments of the invention shown in FIG. 9, hydraulic cylinders 100 and 101 may be mounted on the side plates 75 by means of brackets 102 and 103, respectively. Vertically extending jack rods 104 and 105 are secured to the pistons within such cylinders and extension of the piston-cylinder assembly will bring the respective rods into engagement with the elongated members 64 which are integrally formed with the axle saddle 56. In this manner, extension of the rods 104 and 105 vertically downwardly will bring them into engagement with the pivoting axle saddle to preclude relative movement between the frame and the rear axle 5. Whereas only two specific forms of the stabilizer have been illustrated, it will, of course, be realized that other stabilizer mechanisms may be employed, such as, for example, motor driven self-locking jack screws or for that matter stabilizers extending from the frame to the ground itself. In any event, the relative pivotal movement of the rear axle 5 with respect to the frame will be precluded when such stabilizers are energized.

Figures 10, 11:
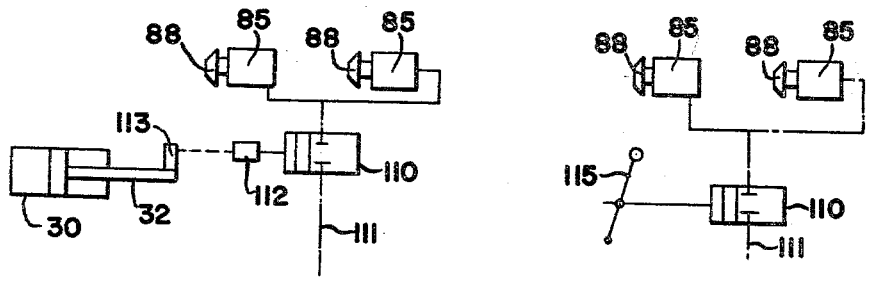
FIG. 10 is a schematic diagram of a pneumatic control system for operating the form of the invention shown in FIG. 5.
FIG. 11 is a similar schematic diagram showing a manual operation of the FIG. 5 embodiment.
Figure 5:
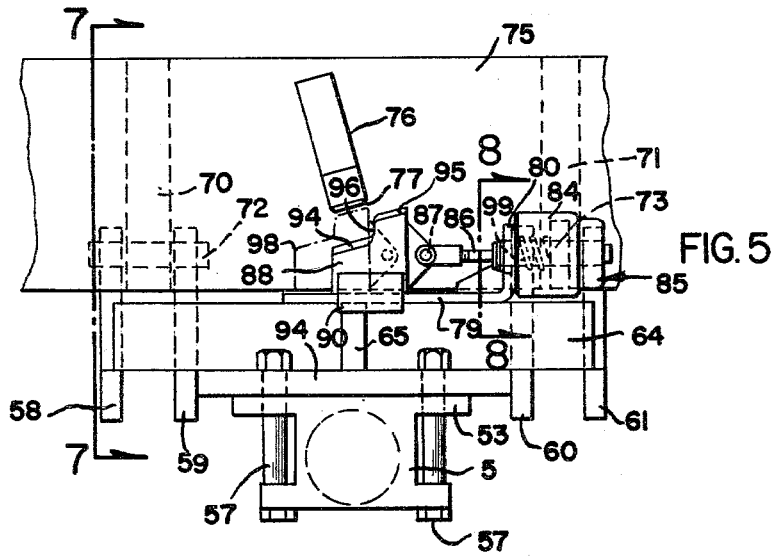
FIG. 5 is an enlarged fragmentary detail side elevation of the rear axle saddle showing one form of stabilizer in accordance with the present invention.
Figure 6:
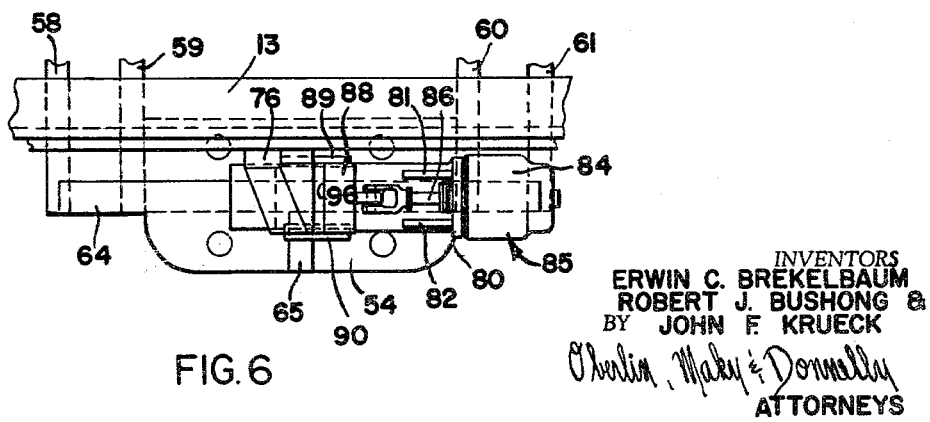
FIG. 6 is a fragmentary top plan view of such stabilizer of FIG. 5.
Figure 8:
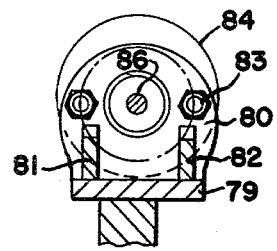
FIG. 8 is an enlarged vertical section taken on the line 8—8 of FIG. 5.

Referring now to FIGS. 10 and 11, there is illustrated an automatic and manual control respectively for operating the embodiment of the invention shown in detail in FIGS. 5 and 8. It will be recalled that the lift cylinders 30 will first be extended to elevate the bucket 19 to its front loading position shown in FIG. 2. Then the overshot cylinders 40 will be extended to move the bucket over the top of the tractor to the overshot loading position shown in FIG. 3. Normally, the extension of the cylinders 30 and 40 will be consecutive so that the bucket 19 will move continuously from the digging FIG. 1 position to the overshot loading FIG. 3 position.

Since it is desirable to have the stabilizers in operation as the bucket 19 moves rearwardly, the control in FIG. 10 accomplishes the energization of the cylinders 85 as soon as the lift cylinders 30 are extended. A shut-off valve 110 in air supply line 111 may be shifted by mechanical engagement of the plunger 112 of such valve with a rod actuated abutment 113. Thus as the lift cylinders extend to their completed elevating stroke, the shut-off valve 110 will be shifted to open position supplying air under pressure through the supply line 111 to the blind ends of the stabilizer air cylinders 85 causing the wedge blocks 88 to shift forwardly to operative position. As the load in the bucket 19 then moves rearwardly by the energization of the overshot cylinders 40, the frame will be precluded from shifting relative to the rear axle. It should be kept in mind that FIG. 10 is a schematic disclosure and that other suitable mechanisms responsive to the extension of the lift cylinders 30 may be employed to operate the valve 110. Also, it will be understood that the initial movement of the overshot cylinders 40 could also be employed to shift the shut-off valve 110.

In FIG. 11, a manually operated control 115 may be employed to shift the spool of the shut-off valve 110 to cause the energization of the stabilizer cylinders 85 at the discretion of the operator. It should be further obvious to one skilled in the art that the control systems of FIGS. 10 and 11 can be combined so that the control system will function either automatically or at the discretion of the operator.

Figure 12:
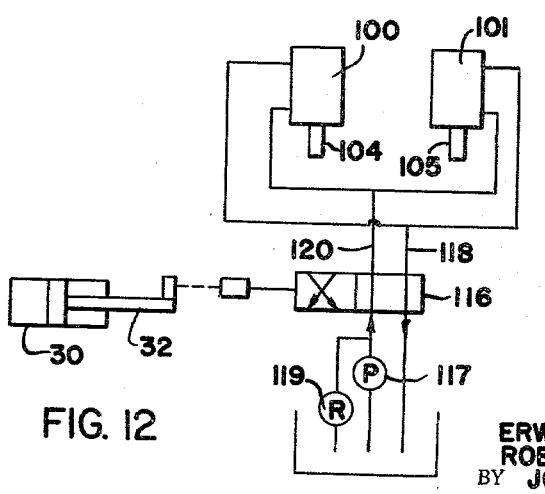
FIG. 12 is a schematic diagram of a hydraulic control system that may be employed with the embodiment of the invention shown in FIG. 9.

In FIG. 12, there is illustrated a control system for the embodiment of the invention shown in FIG. 9. In such control system, the extension of the rods 32 of the lift cylinders will shift the spool of a hydraulic directional valve 116 supplying fluid from the hydraulic pump 117 to the line 118 to cause fluid to enter the blind ends of the cylinders 100 and 101 extending the rods 104 and 105, respectively. A pressure responsive relief or unloading valve 119 may be employed to maintain the rods extended at the desired hydraulic pressure. As the rods 32 of the lift cylinders 30 are retracted, the spool of the valve 116 will return to its position shown supplying hydraulic fluid under pressure to the line 120 retracting the rods 104 and 105. In any event, with the control systems shown in FIG. 10 or 12, the stabilizer for the rear axle of the tractor will automatically be actuated upon the completion of the elevation of the bucket to the position shown in FIG. 2 and prior to the beginning of the overshot movement obtained by extension of the overshot cylinders 40.

It can now be seen that there is provided a stabilizer for front end and overshot loaders which will either selectively or automatically preclude relative movement of the frame and rear axles for the overshot loading operation. In this manner, lateral tractor stability will be ensured during such overshot loading and the frame of the tractor will not be subjected to the undesirable twisting and deflecting forces which may impair component alignment.

Other modes of applying the principle of the invention may be employed, change being made as regards the details described, provided the features stated in any of the following claims or the equivalent of such be employed.

We, therefore, particularly point out and distinctly claim as our invention:

1. In an overshot loader, a tractor comprising a tractor frame, a pair of arms proximally pivoted to said tractor frame, a loading bucket distally mounted on said arms, means operative to swing said arms about their proximal pivot to elevate said bucket to a front loading position, means operative further to swing said arms to move said bucket to a rear overshot loading position, a front axle rigidly secured to said tractor frame, a rear axle pivoted to said frame for limited swinging movement about an axis extending centrally longitudinally of said frame, ground engaging wheels mounted on the ends of said axles, and means operative to preclude relative movement of said frame and rear axle about such axis during such movement of the bucket from said front loading position to said overshot loading position regardless of the relative position of said rear axle and said frame.

2. A loader as set forth in claim 1 wherein said last-mentioned means includes movable wedge blocks adapted to be shifted to a position between said tractor frame and said rear axle for such overshot loading.

3. In an overshot loader, a tractor comprising a tractor frame, a pair of arms proximally pivoted to said tractor frame, a loading bucket distally mounted on said arms, means operative to swing said arms about their proximal pivot to elevate said bucket to a front loading position, means operative further to swing said arms to move said bucket to a rear overshot loading position, a front axle rigidly secured to said tractor frame, a rear axle pivoted to said frame for limited swinging movement about an axis extending centrally longitudinally of said frame, ground engaging wheels mounted on the ends of said axles, and means operative to preclude relative movement of said frame and rear axle about such axis during such movement of the bucket from said front loading position to said overshot loading position, said last-mentioned means including movable wedge blocks adapted to be shifted to a position between said tractor frame and said rear axle for such overshot loading, single acting pneumatic piston-cylinder assemblies connected to said wedge blocks, and means responsive at least to the elevation of said bucket to such front loading position to extend said piston-cylinder assemblies to engage said wedge blocks between said tractor frame and rear axle.

4. A loader as set forth in claim 3 including an axle saddle mounted on said rear axle and pivoted to said frame, said wedge blocks being slidably mounted on said axle saddle to and from such stabilizing position.

5. A loader as set forth in claim 1 wherein said last-mentioned means includes vertically movable hydraulic jacks mounted on said frame adapted to be extended to engage said rear axle thus to preclude relative movement of the frame and rear axle during such overshot loading.

6. In an overshot loader, a tractor comprising a tractor frame, a pair of arms proximally pivoted to said tractor frame, a loading bucket distally mounted on said arms, means operative to swing said arms about their proximal pivot to elevate said bucket to a front loading position, means operative further to swing said arms to move said bucket to a rear overshot loading position, a front axle rigidly secured to said tractor frame, a rear axle pivoted to said frame for limited swinging movement about an axis extending centrally longitudinally of said frame, ground engaging wheels mounted on the ends of said axles, and means operative to preclude relative movement of said frame and rear axle about such axis during such movement of the bucket from said front loading position to said overshot loading position, said last-mentioned means including vertically movable hydraulic jacks mounted on said frame adapted to be extended to engage said rear axle thus to preclude relative movement of the frame and rear axle during such overshot loading, and means responsive to the movement of the bucket to at least such front loading position to extend said hydraulic jacks.

7. In an overshot loader, a tractor comprising a tractor frame, a pair of arms pivoted to said tractor frame, a loading bucket mounted on the ends of said arms, means operative to swing said bucket to an overshot loading position, a front axle rigidly secured to said tractor frame, a rear axle pivoted to said frame for limited swinging movement about an axis extending centrally longitudinally of said frame, ground engaging wheels mounted on the ends of said axles, and means operative to preclude relative movement of said frame and rear axle about such axis as said bucket is moved to overshot loading position regardless of the relative position of said rear axle and said frame.

8. In an overshot loader, a tractor comprising a tractor frame, a pair of arms pivoted to said tractor frame, a loading bucket mounted on the ends of said arms, a front axle rigidly secured to said tractor frame, a rear axle pivoted to said frame for limited swinging movement about an axis extending centrally longitudinally of said frame, ground engaging wheels mounted on the ends of said axles, and means operative selectively to preclude relative movement of said frame and rear axle about such axis as said bucket moves to overshot loading position regardless of the relative position of said rear axle and said frame.

References Cited by the Examiner

UNITED STATES PATENTS 2,427,968  9/47  Hoover _____ 214—140

FOREIGN PATENTS 765,417  1/57  Great Britain.

HUGO O. SCHULZ, *Primary Examiner.*